United States Patent Office 3,808,341
Patented Apr. 30, 1974

3,808,341
FOOD PRODUCT
Elbert H. Rongey, Fullerton, and Eckhardt Hooss, Pacific Palisades, Calif., assignors to Kal Kan Foods, Inc., Vernon, Los Angeles, Calif.
No Drawing. Filed Nov. 15, 1971, Ser. No. 198,775
Int. Cl. A23k 1/10; A23l 1/32
U.S. Cl. 426—92                             8 Claims

ABSTRACT OF THE DISCLOSURE

A food product having a core of nutritious, edible, low-cost materials covered by a coating of an edible foodstuff of substantially higher palatability than that of the core and to which is applied a quantity of particulate, flavor-imparting bits of precooked meat, poultry or fish, wherein the coating serves substantially to inhibit migration therethrough of the core flavors and acts as a bonding medium for securing the particulate flavor bits to the core.

SPECIFICATION

This invention relates to a food product having a central core of nutritious but comparatively low-cost farinaceous and proteinaceous materials suitably treated and formed into pieces of desired size and shape coated with an edible material of substantially higher palatability than that of the core and to which is bonded a quantity of particulate flavor-imparting bits of precooked meat, poultry or fish.

The invention affords a useful breakfast or snack food product, and one which is also well adapted for use as a pet food. In its adaptation as a pet food, the coating and particulate flavor enhancement functions so to mask the flavor of the less palatable core materials as to permit selection of core ingredients chiefly by their nutritional qualities rather than the standpoint of palatability. Presently available food products prepared for consumption by dogs and cats are generally commonplace and unimaginative in appearance, lacking sales appeal to the pet owner accustomed otherwise to be discriminating in buying food products. One objective of the present invention is a product which is appetizing in its appeal to the purchaser, whether for human or animal consumption, as by suggtstion both visually and by its components some well-known dish of recognized popularity, as, for example, bacon and eggs. Thus, in one embodiment of the invention, a core of nutritious materials is coated with a thermal setting material which has egg as a major constituent, so treated and applied as to resemble a fluffy scrambled egg in appearance, although the egg content has not in fact been scrambled, in the surface of which is visibly present a quantity of precooked bacon bits. By this invention other conventional foods may likewise be simulated in a product which, in fact, contains a sufficient quantity of the raw components of the food simulated to permit the product accurately to be designated by the name of the simulated product.

The central core can be of any of a wide choice of comestible materials of desired nutrient value, and we prefer a mixture of proteinacious and farinaceous components such as cereals, legumes, meat or fish meals, bone meals, oil seeds, or the like. The selection of raw materials may be governed partly by factors other than nutriment as, for example, that of texture, which may range from a soft, gelatinous form to a firmer, dry, crunchy texture. To that end, the core may contain vegetable gums, egg proteins and other materials, known to affect texture, and the core may be produced by cold extrusion, cooking expansion or otherwise. Once formed, the core may be coated or undergo secondary treatments to remove excess moisture or to reduce moisture uptake, such as by drying or baking, using hot air, open flames, microwave, infrared heating, or other conventional means. The imbibition of moisture may be retarded by the application of film-forming materials, including fats, oils, or other edibles. Suitable coloring materials may also be added. Vitamin, mineral or amino acids supplement may be incorporated in the core even though they may detract even further from palatability of the core per se.

The coating which masks the flavor of the central core is preferably a suspension or stable emulsion of materials comprising whole egg, admixed with whey proteins, non-fat dry milk or dried cheese in conjunction with coloring and flavoring materials. The moisture content and extent of aeration of the coating mix will vary depending upon the desired viscosity characteristics and desired final texture and appearance. Although the viscosity of the coating mix may be low for multiple thin coatings, we prefer a viscosity approximating that of honey. This gives sufficient flowability to insure complete coating of the core and yet is sufficiently thick so as not to require multiple coatings. The coatings are preferably thermal setting, and we have found it effective to apply the coatings to the surface of hot cores as they leave the drying oven, by spraying, tumble-coating or by the use of conventional enrobing or battering equipment. By suitable control of the temperatures of the coating, the core and the surrounding atmosphere, uniform coatings comparable to those formed by enrobing techniques may be attained.

This primary coating is desirably continuous or virtually so. To the coated core is then applied as a secondary discontinuous coat a quantity of flavor-imparting discrete particles which are preferably finely chopped, precooked bits of bacon, liver, beef, chicken, ham or other flavor-enhancing materials. These components are applied while the coating is still wet, preferably by sprinkle deposit as the coated cores travel by conveyor to the cooking stage.

Finally, the food pieces consisting of coated cores to which the particulate flavor-enhancing components have been added are cooked as by deep fat frying at any suitable temperature, such, for example, as 300° F. Other cooking methods may be employed.

As the product leaves the cooking bath, it is conveyed to a suitable refrigerating apparatus for chilling prior to packaging. During this cooling stage, vitamins or other nutrients or preservatives that have poor heat stability and do not adversely affect flavor may be added.

For the desired textural quality, the product must have the proper moisture content. During manufacture, the moisture content varies, water being added in compounding the dry core materials to facilitate handling such as by extrusion to form a soft, fragile core, which has been found desirable; the product later loses some of its water content during cooking.

The moisture content of the finished product is preferably in the range of about 10% to about 14% by weight, although for certain textural qualities these limits may be broadened to from 5% to 25% water by weight of the finished product. Materials of the kind used in the manufacture of semimoist foods may be substituted to provide a product having a soft semimoist center with a dry outer coating or the inverse system may be employed, if desired. The water content for such products may range as high as 45% by weight.

We have found that food products made in accordance with this invention are well adapted for their intended purpose. The primary coat serves well its function of masking the less palatable flavors of the core. To that end, the coating ideally is continuous, although in practice small uncoated areas are permissible, depending upon the palatability characteristics of the core. The coating should be no thinner than 1/32 of an inch and need not exceed ¼ of an inch in thickness and is desirably in the range of from 1/16 to 1/8 of an inch, although the thickness may, of course, vary widely from piece to piece and even in individual pieces. The coating is dyed appropriately so that in combination with the particulate flavor components the dress of the food piece appropriately conveys the sales message intended. The food product has excellent keeping qualities.

The following are typical examples of products and methods of manufacture. In appearance the products, in most instances, resemble pieces of omelet of one or another predominating flavor as the components indicate. Quantities are specified both in terms of percentage by weight of the raw mix and percentage by weight of the cooked product indicating the variance in quantity weight percentages due largely to loss of water and gain of fat during cooking. Some of the water lost is from water added as indicated; otherwise, water lost is from the natural water content of the raw components.

EXAMPLE I

| Ingredients | Percent Raw mix | Cooked product |
|---|---|---|
| Total mix: | | |
| Core | 47.2 | 54.2 |
| Primary Coat | 31.9 | 21.8 |
| Secondary Coat | 20.9 | 24.0 |
| Total | 100.0 | 100.0 |
| Core: | | |
| Soy grits defatted | 33.0 | 17.8 |
| Oat meal | 27.6 | 15.0 |
| Rice flour | 27.6 | 15.0 |
| Steamed bone meal | 9.7 | 5.3 |
| Dried whole egg | 2.1 | 1.1 |
| Total | 100.0 | 54.2 |
| Primary coat: | | |
| Whole egg | 64.6 | 13.4 |
| Soy bean and whey flour | 20.7 | 7.6 |
| Vegetable gum | 1.1 | 0.4 |
| Color (yellow) | 0.8 | 0.3 |
| TiO$_2$ | 0.3 | 0.1 |
| Water | 12.5 | |
| Total | 100.0 | 21.8 |
| Secondary coat: Bacon | 100.0 | 24.0 |
| Total | 100.0 | 24.0 |

In making the product the dry ingredients of the core to which a small quantity of hot water or live steam is introduced for surface wetting are thoroughly mixed and extruded as a soft, fragile core of desirable shape and dimensions such as cylinders 3/8 inch diameter by 3/8 inch in length. The extruded product is tumbled lightly to eliminate fines and to smooth any sharp corners that may be conducive to thin coatings. The fines are recycled. The tumbled product is dried at 225° F. for approximately 30 minutes. The primary coat, which is predominantly whole egg and includes white pigment and yellow dye, is made as an emulsion and is applied to the core by a mixture in a Tempura Batterer in the proportions of 65 parts core and 35 parts of coating mix.

The secondary coat is prepared by grinding the raw bacon through a ¼ inch grinder after which the bacon is cooked in a skillet until it becomes particulate in form with the pieces only half cooked to crispness. These food bits are applied to the coated core. The entire product is the deep fat fried in 300° F. fat for 90 seconds. The product is removed to a draining conveyor and cooled prior to packaging.

Examples II, III and IV, which follow, are modified formulas. The steps in the manufacture may be the same as in Example I.

EXAMPLE II

Using the same core and primary coat the product is made with the following coat of particulate materials:

| Ingredients | Percent Raw mix | Cooked product |
|---|---|---|
| Secondary cost: | | |
| Bacon | 76.0 | 18.2 |
| Liver | 24.0 | 5.8 |
| Total | 100.0 | 24.0 |

EXAMPLE III

This product has the same core as in Examples I and II.

| Ingredients | Percent Raw mix | Cooked product |
|---|---|---|
| Total mix: | | |
| Core | 47.2 | 54.2 |
| Primary coat | 37.0 | 27.5 |
| Secondary coat | 15.8 | 18.3 |
| Total | 100.0 | 100.0 |
| Primary coat: | | |
| Whole egg | 55.9 | 13.3 |
| Soy bean and whey flour | 17.9 | 7.6 |
| Vegetable gum | 1.0 | 0.4 |
| Chicken | 13.5 | 5.8 |
| Color B | 0.7 | 0.3 |
| TiO$_2$ | 0.2 | 0.1 |
| Water | 10.8 | |
| Total | 100.0 | 27.5 |
| Secondary coat: | | |
| Liver | 10.9 | 2.0 |
| Chicken (whole) 3/16" | 23.5 | 4.3 |
| Bacon fat | 65.6 | 12.0 |
| Total | 100.0 | 18.3 |

EXAMPLE IV

This product differs from the foregoing in the primary and secondary coats.

| Ingredients | Percent Raw mix | Cooked product |
|---|---|---|
| Total mix: | | |
| Core | 47.2 | 54.2 |
| Primary coat | 31.9 | 21.8 |
| Secondary coat | 20.9 | 24.0 |
| Total | 100.0 | 100.0 |
| Primary coat: | | |
| Whole eggs | 61.5 | 12.3 |
| Soy bean and whey flour | 20.7 | 7.6 |
| Vegetable gum | 1.1 | 0.4 |
| Color B | 0.8 | 0.3 |
| TiO$_2$ | 0.3 | 0.1 |
| Water | 12.5 | |
| Cheese dried | 3.1 | 1.1 |
| Total | 100.0 | 21.8 |
| Secondary coat: Beef trimmings | 100.0 | 24.0 |
| Total | 100.0 | 24.0 |

EXAMPLE V

| Ingredients | Percent Raw mix | Cooked product |
|---|---|---|
| Total mix: | | |
| Core | 46.6 | 52.4 |
| Primary coat | 38.3 | 28.2 |
| Secondary coat | 15.1 | 19.4 |
| Total | 100.0 | 100.0 |
| Core: | | |
| Soy grits defatted | 21.6 | 16.0 |
| Oat flakes | 13.5 | 9.9 |
| Rice flour | 13.5 | 9.9 |
| Dry whole eggs | 3.4 | 2.5 |
| Water | 29.0 | |
| Bone meal | 9.5 | 7.0 |
| Dried whey | 4.7 | 3.5 |
| Torula yeast | 2.9 | 2.2 |
| Cheese rind | 1.9 | 1.4 |
| Total | 100.0 | 52.4 |

Core material is mixed together and then the water is added. The mix is extruded through a low pressure extruder and cut into pieces between ½ inch and 1 inch in length at ½ inch diameter, then dried at not more than 250° F. to a moisture content of 5.6 percent.

|  | Percent | |
| Ingredients | Raw mix | Cooked product |
| --- | --- | --- |
| Coat: | | |
| Whole eggs (75% water) | 45.2 | 4.8 |
| Dried whey | 18.1 | 7.7 |
| Torula yeast | 10.8 | 4.6 |
| Cheese rind | 7.3 | 3.1 |
| Bacon | 16.3 | 7.0 |
| Coloring | 1.4 | 0.6 |
| Vegetable gum | 0.9 | 0.4 |
| Total | 100.0 | 28.2 |

The coating material is mixed together and the vegetable gum is added last. After that, the mix must be homogenized to achieve a high viscosity like dextrose syrup.

When a good coat is reached then the so-coated particles are sprinkled with precooked bacon bits. Then these parts are deep fat fried in bacon fat at 300° F. for 1 minute. This drives enough moisture out of the coat so that the average moisture content is between 10 and 12%. The coat picks up between 12 and 15% bacon fat and attains a good bacon flavor. After cooling, the product is packed to preserve the flavor.

Example VI is a product with chicken and liver taste:

|  | Percent | |
| Ingredients | Raw mix | Cooked product |
| --- | --- | --- |
| Total mixture: | | |
| Core | 46.3 | 58.3 |
| Primary coat | 34.5 | 25.0 |
| Lard | 12.5 | 12.5 |
| Liver | 6.7 | 4.2 |
| Total | 100.0 | 100.0 |
| Core: | | |
| Soy grits (defatted) | 21.6 | 17.7 |
| Oat flakes | 13.5 | 11.1 |
| Rice flour | 13.5 | 11.1 |
| Dry whole eggs | 3.4 | 2.8 |
| Water | 29.0 | |
| Bone meal | 9.5 | 7.8 |
| Dried whey | 4.7 | 3.8 |
| Torula yeast | 2.9 | 2.4 |
| Cheese rinds | 1.9 | 1.6 |
| Total | 100.0 | 58.3 |

The core material is mixed together and then the water is added. The mix is extruded through a low pressure extruder with a plate with irregular holes, diameter ranging from ⅜ inch to ⅝ inch, and cut into lengths from ½ inch to ¾ inch.

|  | Percent | |
| Ingredients | Raw mix | Cooked product |
| --- | --- | --- |
| Coat: | | |
| Whole eggs (75% water) | 78.5 | 11.9 |
| Chicken | 19.6 | 11.9 |
| Coloring | 1.4 | 0.9 |
| Vegetable gum | 0.5 | 0.3 |
| Total | 100.0 | 25.0 |

The coating ingredients are mixed before the vegetable gum is added. The chicken is ground into ⅛ inch pieces, roasted to remove a part of the water, and develop a better flavor.

When a good coating and complete coverage are reached, then precooked liver bits at ⅛ inch size are added on top. This so-treated product is fried in lard at 275° F. for 75 seconds. This product has a strong odor of liver.

Example VII is a product with chicken and cheese taste:

|  | Percent | |
| Ingredients | Raw mix | Cooked product |
| --- | --- | --- |
| Total mix: | | |
| Core | 27.1 | 41.7 |
| Primary coat | 52.5 | 41.7 |
| Chicken | 20.4 | 16.6 |
| Total | 100.0 | 100.0 |
| Core: | | |
| Soy grits defatted | 28.4 | 16.3 |
| Water | 27.4 | |
| Wheat germ | 9.4 | 5.4 |
| Wheat flour | 9.4 | 5.4 |
| Wheat starch | 9.4 | 5.4 |
| Modified corn starch | 9.4 | 5.4 |
| Dry eggs | 6.6 | 3.8 |
| Total | 100.0 | 41.7 |

After all dry ingredients are well mixed, the water is added. This mix is run through a continuous cooker extruder (Wenger) which delivers expanded balls from 1½ inch to 2 inches in diameter. After drying, these balls are broken into irregular pieces of about ½ inch to ¾ inch. The moisture content is 6 to 8%. After that the pieces are fried at low temperature for 30 seconds at 200 to 220° F. During that time they pick up approximately 12% fat.

|  | Percent | |
| Ingredients | Raw mix | Cooked product |
| --- | --- | --- |
| Coat: | | |
| Whole eggs (75% water) | 90.1 | 29.0 |
| Dried cheddar cheese | 8.4 | 10.8 |
| Vegetable gum | 1.5 | 1.9 |
| Total | 100.0 | 41.7 |

The coat batter is mixed and homogenized and applied to the core. Precooked, roasted, ⅛ inch pieces of chicken are sprinkled on the surface and the product is blanched in a chicken broth at 200° F. for 3 to 4 minutes, long enough to pick up enough flavor. After that the product is dried to 10% moisture at low temperature, 200° F.

Example VIII is a product with beef taste:

|  | Percent | |
| Ingredients | Raw mix | Cooked product |
| --- | --- | --- |
| Total mix: | | |
| Core | 43.0 | 48.0 |
| Primary coat | 40.9 | 32.0 |
| Beef | 16.1 | 20.0 |
| Total | 100.0 | 100.0 |
| Core: | | |
| Soy grifts defatted | 28.3 | 18.7 |
| Water | 27.3 | |
| Weat germ | 14.2 | 9.4 |
| Wheat flour | 14.2 | 9.4 |
| Barley grits | 9.4 | 6.2 |
| Dry eggs | 6.6 | 4.3 |
| Total | 100.0 | 48.0 |

The core material is mixed and low pressure extruded to ½ inch round particles with variable length of ½ inch to ¾ inch. Then it is dried at 300° F. for 20 minutes to a moisture content of 5 or 6%.

|  | Percent | |
| Ingredients | Raw mix | Cooked product |
| --- | --- | --- |
| Coat: | | |
| Water | 49.3 | |
| Dry whole eggs | 29.6 | 18.7 |
| Non-fat dry milk | 19.7 | 12.4 |
| Coloring | 1.0 | 0.6 |
| Vegetable gum | 0.4 | 0.3 |
| Total | 100.0 | 32.0 |

The coat is prepared and while homogenized nitrogen gas is serrated into the batter.

Precooked ⅛ inch beef particles are sprinkled on top and the product is then fried at 325° F. beef fat obtained from the roasting.

During the 1-minute frying, the nitrogen gas incorporated in the batter expands and forms big bubbles which collapse after frying. This gives a good scrambled egg surface appearance.

Example IX is a product with bacon and liver taste:

| Ingredients | Percent | |
|---|---|---|
| | Raw mix | Cooked product |
| Total mix: | | |
| Core | 42.8 | 56.4 |
| Primary coat | 33.9 | 24.2 |
| Lard | 12.9 | 12.9 |
| Liver | 10.4 | 6.5 |
| Total | 100.0 | 100.0 |
| Core: | | |
| Whole eggs (75% water) | 36.4 | 7.0 |
| Soy grits defatted | 24.2 | 18.8 |
| Modified corn starch | 21.2 | 16.5 |
| Rice flour | 15.2 | 11.8 |
| Torula yeast | 3.0 | 2.3 |
| Total | 100.0 | 56.4 |

Whipped whole eggs are mixed with the dry ingredients and then cold extruded and cut into not larger than 1-inch pieces. After drying at 400° F. for 15 minutes, the core is very crunchy.

| Ingredients | Percent | |
|---|---|---|
| | Raw mix | Cooked product |
| Coat: | | |
| Whole egg (75% water) | 78.4 | 17.1 |
| Liver (75% water) | 19.0 | 4.9 |
| Coloring | 1.3 | 1.1 |
| Vegetable gum | 1.3 | 1.1 |
| Total | 100.0 | 24.2 |

The coat containing a liver slurry for better flavor distribution is mixed and homogenized to develop a heavy viscosity.

One-eighth inch ground liver is short fried for 30 seconds in 300° F. lard and then applied to the coated core.

The product is fried in bacon fat at 325° F. for 50 to 60 seconds.

Example X is a product with bacon and chicken taste:

| Ingredients | Percent | |
|---|---|---|
| | Raw mix | Cooked product |
| Total mix: | | |
| Core | 29.0 | 40.0 |
| Primary coat | 48.9 | 40.0 |
| Chicken | 10.1 | 8.0 |
| Bacon fat | 12.0 | 12.0 |
| Total | 100.0 | 100.0 |
| Core: | | |
| Soy grits defatted | 20.2 | 9.8 |
| Wheat flour | 18.3 | 8.9 |
| Water | 17.5 | |
| Barley grits | 13.8 | 6.7 |
| Bacon | 8.3 | 4.1 |
| Bone meal | 7.4 | 3.6 |
| Dried whey | 3.2 | 1.6 |
| Torula yeast | 3.7 | 1.8 |
| Cheese rinds | 1.3 | .6 |
| Modified corn starch | 2.7 | 1.3 |
| Dry eggs | 1.8 | .8 |
| Wheat gluten | 1.8 | .8 |
| Total | 100.0 | 40.0 |

The core material is mixed together, then pumped through a scraped surface heat exchanger to plasticize the starches. The mix exits at approximately 220° F. and is then put on a steam-heated drum dryer. The distance between the drums will be 1/32 inch. The film sticks to one drum and will be pulled off after 270° rotation. The pick-up roll moves slightly faster than the drying drum. By this the molecules become oriented and the film stays flexible even when it is dry. Then the film rolls loose until it reaches ¾ inch thickness. The film is cut in pieces of ⅛ inch to ¾ inch and cool them.

| Ingredients | Percent | |
|---|---|---|
| | Raw mix | Cooked product |
| Coat: | | |
| Whole eggs (75% water) | 45.2 | 6.8 |
| Dried whey | 18.1 | 11.0 |
| Bacon | 16.3 | 9.8 |
| Torula yeast | 10.8 | 6.5 |
| Cheese rind | 7.3 | 4.4 |
| Coloring | 0.9 | 0.6 |
| Vegetable gum | 0.9 | 0.6 |
| $TiO_2$ | 0.5 | 0.3 |
| Total | 100.0 | 40.0 |

The coating material is mixed and homogenized and applied to the core. After good coating is reached, pre-roasted, ⅛ inch to 3/16 inch chicken pieces are sprinkled onto the soft surface and the so-prepared product is fried in bacon fat at 275° F. for 60 to 70 seconds.

Example XI relates to a product with beef, liver, chicken and bacon aroma:

| Ingredients | Percent | |
|---|---|---|
| | Raw mix | Cooked product |
| Total mix: | | |
| Core | 35.7 | 48.1 |
| Primary coat | 34.9 | 26.0 |
| Chicken | 18.3 | 14.8 |
| Bacon fat | 11.1 | 11.1 |
| Total | 100.0 | 100.0 |
| Core: | | |
| Wheat flour | 20.2 | 11.8 |
| Soy grits defatted | 20.2 | 11.8 |
| Barley grits | 15.2 | 8.9 |
| Blood (80% water) | 15.2 | 1.8 |
| Bone meal | 8.1 | 4.7 |
| Beef tissue (50% water) | 5.0 | 1.4 |
| Dried whey | 4.1 | 2.4 |
| Water | 3.0 | |
| Rice flour | 3.0 | 1.8 |
| Torula yeast | 4.4 | 2.6 |
| Cheese rinds | 1.6 | .9 |
| Total | 100.0 | 48.1 |

The core dry materials are mixed together then the beef tissue is added and then the blood and water. The mix is cold extruded at low pressure into round pieces of irregular length. After extrusion, it is run through a tumbler to round the edges. Then it is dried by going through a microwave tunnel to heat it from the inside and drive the moisture to the surface and then it is run through an infrared tunnel to roast the surface and finally dry it.

| Ingredients | Percent | |
|---|---|---|
| | Raw mix | Cooked product |
| Coat: | | |
| Whole eggs (75% water) | 79.4 | 12.8 |
| Cheese, dried | 19.0 | 12.2 |
| Vegetable gum | 1.3 | .8 |
| $TiO_2$ | 0.3 | .2 |
| Total | 100.0 | 26.0 |

The hot core is battered with approximately 35 percent coat. The hot core sets the proteins very fast and gives good adhesion. After battering, precooked chicken bits as described before are sprinkled on top and then the product is fried in bacon fat at 300° F. for 1 minute.

Example XII relates to a product with ham and cheese aroma:

| Ingredients | Percent | |
|---|---|---|
| | Raw mix | Cooked product |
| Total mix; | | |
| Core | 34.2 | 46.2 |
| Primary coat | 39.1 | 30.8 |
| Ham | 15.2 | 11.5 |
| Lard | 11.5 | 11.5 |
| Total | 100.0 | 100.0 |
| Core; | | |
| Soy grits defatted | 21.6 | 14.1 |
| Oat flakes | 13.5 | 8.8 |
| Rice flour | 13.5 | 8.8 |
| Whole eggs (75% water) | 13.5 | 2.2 |
| Water | 18.9 | |
| Bone meal | 9.5 | 6.2 |
| Dried whey | 4.7 | 3.0 |
| Torula yeast | 2.9 | 1.8 |
| Cheese rind | 1.9 | 1.3 |
| Total | 100.0 | 46.2 |

Core material is mixed together and then the water is added. The mix is extruded through a low pressure extruder and cut into pieces between ½ inch and 1 inch in length at ½ inch diameter, then dried at not more than 250° F. to a moisture content of 5 to 6 percent.

| Ingredients | Percent | |
|---|---|---|
| | Raw mix | Cooked product |
| Coat; | | |
| Whole eggs (75% water) | 90.1 | 21.4 |
| Dried cheddar cheese | 8.4 | 18.0 |
| Vegetable gum | 1.5 | 1.4 |
| Total | 100.0 | 30.8 |

The coat batter is mixed and homogenized and applied to the core. Roasted ham pieces at ¼ inch to ⅜ inch are sprinkled on the surface then fried in lard at 325° F. for 45 to 55 seconds.

In the products of our invention, the protein content may range from 5% to 45%, more desirably from 12% to 30% and preferably from 20% to 25%. The fat content may vary from 10% to 40%, more desirably from 15% to 30% and preferably at an 18% to 22% level.

We claim:

1. A food product having the substantial appearance, flavor and aroma of cooked egg in the form of discrete pieces comprising cores enclosed within covers of substantial thickness encasing the surfaces and tenaciously bonded around, concealing and masking the taste and appearance of said cores, said covers comprising a substantial quantity of cooked egg solids to provide the flavor, taste and aroma characteristics of cooked egg of higher palatability than that of the cores, and masking said core material, said cores being formed of material of generally lower palatability and composed in substantial part of starch-containing cereal alone or admixed with ground meat or fish.

2. The food product as defined in claim 1 having further adhered to the surface a quantity of particulate, flavor imparting bits of cooked meat, poultry or fish bonded to the cores by said egg coating.

3. The method of making discrete food pieces comprising forming discrete pieces of core materials composed in substantial part of starch-containing cereal alone or admixed with ground meat or fish, applying to the cores covers of substantial thickness encasing the surfaces and concealing and masking the taste and appearance of said cores, said covers comprising whole egg, and thereafter cooking the pieces to coagulate the egg and to provide the flavor, taste and aroma characteristic of cooked egg of high palatability.

4. The method of claim 3 which includes the further step of applying to the suface of the egg covers a quantity of particulate flavor imparting bits of cooked meat, poultry or fish.

5. The method of claim 3 in which the cooking is in animal or vegetable fat or mixtures thereof for further enhancement of palatability.

6. A food product having the substantial appearance, flavor and aroma of cooked egg in the form of discrete pieces comprising cores enclosed within covers of substantial thickness encasing the surfaces and tenaciously bonded around, concealing and masking the taste and appearance of said cores, said covers comprising a substantial quantity of cooked egg solids to provide the flavor, taste and aroma characteristics of cooked egg of higher palatability than that of the cores, and substantially inhibiting migration of core flavors to the surface, said cores being formed of material of generally lower palatability and composed in substantial part of starch-containing cereal alone or admixed with ground meat, ground fish, legumes, bone meals or oil seeds, and a quantity of particulate flavor imparting bits of food material adhered to the surface of the covers and presenting an appearance and flavor contrasting with that of the egg.

7. The food product of claim 6 having a moisture content of about 5–45% by weight, a protein content of about 5–45% by weight, and a fat content of about 10–40% by weight.

8. The food product of claim 6 in which the said coating is of an average thickness ranging from about 1/32 to about ¼ of an inch.

References Cited
UNITED STATES PATENTS

| | | | |
|---|---|---|---|
| 3,078,172 | 2/1963 | Libby | 99—192 |
| 2,585,364 | 2/1952 | Wright et al. | 99—169 |
| 2,742,364 | 8/1956 | Neumann | 99—168 |
| 2,060,490 | 11/1936 | Borbely | 99—166 |
| 2,910,370 | 10/1959 | Rogers et al. | 99—169 |
| 3,653,924 | 4/1972 | Penton | 99—166 |
| 3,202,514 | 8/1965 | Burgess et al. | 99—2 |
| 3,615,647 | 10/1971 | Kassens | 99—166 |
| 3,119,691 | 1/1964 | Ludington et al. | 99—2 |

OTHER REFERENCES

Ziemba, Create New Foods with Textured Soy Protein, Food Engineering, vol. 38, 4–1966, pp. 58–60 (copy available, Library, U.S. Pat. Off.).

JOSEPH SCOVRONEK, Primary Examiner

U.S. Cl. X.R.

426—211, 305

PO-1050
(5/69)

UNITED STATES PATENT OFFICE
CERTIFICATE OF CORRECTION

Patent No. 3,808,341             Dated April 30, 1974

Inventor(s) Elbert H. Rongey and Eckhardt Hooss

It is certified that error appears in the above-identified patent and that said Letters Patent are hereby corrected as shown below:

Column 1, line 45, "suggtstion" should be --suggestion--;

Column 3, line 67, "the" should be --then--;

Column 4, at top in table (Example II), "Secondary cost" should be --Secondary coat--.

Signed and sealed this 8th day of October 1974.

(SEAL)
Attest:

McCOY M. GIBSON JR.
Attesting Officer

C. MARSHALL DANN
Commissioner of Patents